(12) United States Patent
Aggarwal et al.

(10) Patent No.: US 9,077,729 B2
(45) Date of Patent: Jul. 7, 2015

(54) CONTENT MANAGEMENT IN PEER-TO-PEER SYSTEMS

(71) Applicant: QUALCOMM Incorporated, San Diego, CA (US)

(72) Inventors: Pooja Aggarwal, San Ramon, CA (US); Patrik Nils Lundqvist, Encinitas, CA (US); Kiran Shagle Chikkappa, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 13/778,044

(22) Filed: Feb. 26, 2013

(65) Prior Publication Data

US 2014/0244747 A1    Aug. 28, 2014

(51) Int. Cl.

| | |
|---|---|
| G06F 15/16 | (2006.01) |
| H04L 29/08 | (2006.01) |
| H04N 21/266 | (2011.01) |
| H04N 21/414 | (2011.01) |
| H04N 21/442 | (2011.01) |
| H04N 21/8352 | (2011.01) |

(52) U.S. Cl.
CPC .............. *H04L 67/104* (2013.01); *H04L 67/22* (2013.01); *H04N 21/266* (2013.01); *H04N 21/41407* (2013.01); *H04N 21/44222* (2013.01); *H04N 21/8352* (2013.01)

(58) Field of Classification Search
USPC ......................................................... 709/204
See application file for complete search history.

(56) References Cited

U.S. PATENT DOCUMENTS

| 8,131,314 | B2 | 3/2012 | Grigsby et al. | |
|---|---|---|---|---|
| 8,214,475 | B1 | 7/2012 | Scofield et al. | |
| 8,260,882 | B2 | 9/2012 | Kim et al. | |
| 2002/0078174 | A1* | 6/2002 | Sim et al. ...................... | 709/219 |
| 2007/0244983 | A1 | 10/2007 | Berger | |
| 2007/0277205 | A1 | 11/2007 | Grannan | |
| 2008/0222106 | A1* | 9/2008 | Rao et al. .......................... | 707/3 |
| 2010/0011103 | A1 | 1/2010 | Luzzatti et al. | |

OTHER PUBLICATIONS

Chatzopoulou G et al., "A First Step towards Understanding Popularity in YouTube", INFOCOM IEEE Conference on Computer Communications Workshops, 2010, IEEE, Piscataway, NJ, USA, Mar. 15, 2010, pp. 1-6, XP031677468, ISBN: 978-1-4244-6739-6.
International Search Report and Written Opinion—PCT/US2014/016977—ISA/EPO—May 16, 2014.

\* cited by examiner

*Primary Examiner* — Tauqir Hussain
(74) *Attorney, Agent, or Firm* — Arent Fox LLP (57) ABSTRACT

Disclosed are methods, systems, apparatus, devices, products, and other implementations, including a method that includes monitoring a plurality of messages from a plurality of mobile devices, each of at least some of the plurality of messages including at least one identifier of at least one content data record, from a plurality of content data records, stored at least on a sending device sending the respective message, and data representative of number of times the at least one content data record was used on the respective sending device. The method also includes determining popularity metrics for one or more content data records from the plurality of content data records based on the data included in each of the at least some of the plurality of messages representative of the number of times the respective at least one content data record was used on the respective sending device.

32 Claims, 6 Drawing Sheets

CONTENT MANAGEMENT IN PEER-TO-PEER SYSTEMS

BACKGROUND

In a peer-to-peer (P2P) system that is used to share and distribute content, there is generally no central server hosting the content or determining content related use (e.g., view) or popularity metrics that the devices of the system have access to. In such a system, it may be difficult to assess and identify popular content that is available within the system.

SUMMARY

Disclosed herein are methods, systems, apparatus, devices, products, and other implementations, including a method that includes monitoring a plurality of messages from a plurality of mobile devices, each of at least some of the plurality of messages including at least one identifier of at least one content data record, from a plurality of content data records, stored at least on a sending device sending the respective message, and data representative of number of times the at least one content data record was used on the respective sending device. The method also includes determining popularity metrics for one or more content data records from the plurality of content data records based on the data included in each of the at least some of the plurality of messages representative of the number of times the respective at least one content data record was used on the respective sending device.

Embodiments of the method may include at least some of the features described in the present disclosure, including one or more of the following features.

The at least one identifier included in the each of the at least some of the plurality of messages may include data identifying the originator of the associated at least one content data record.

Determining the popularity metrics for the one or more content data records from the plurality of content data records may include determining the sum of the times each of the one or more content data records was used on each sending device on which the respective each of the one or more content data records is stored, and determining a ratio of the sum of the times the each of the one or more of content data records was used on the each sending device on which the respective each of the one or more content data records is stored, and number of sending devices on which the respective each of the one or more content data records is stored.

The method may further include downloading one of the plurality of content data records associated with a popularity metric exceeding a pre-determined popularity threshold.

Downloading the one of the plurality of content data records may include in, response to a determination that number of locally stored content data records exceeds a pre-determined capacity threshold, identifying a locally stored content data record associated with a corresponding popularity metric representative of the identified locally stored content data record being the least popular from the locally stored content data records, and replacing the identified locally stored content data with the one of the plurality of the content data records when the identified locally stored content data record is determined to be less popular than the one of the plurality of content data records.

The method may further include adjusting at each sending device the number of times each of the data content records stored on the respective each sending device was used.

Adjusting at the each sending device the number of times the each of the data content records stored on the respective each sending device was used may include incrementing the number of times a particular data content record, stored on a particular sending device, was viewed when, for example, at least 50% of the particular data content record was presented on the particular sending device, and/or the particular data content record was presented on the particular sending device for a period of time exceeding a pre-determined period.

Adjusting at the each sending device the number of times the each of the data content records stored on the respective each sending device was used may include reducing the number of times a particular data content record stored on a particular sending device when the particular data content record was last presented on the particular device more than a pre-determined period.

Each of the at least some of the plurality of messages further may include at least one flag associated with the respective at least one content data record to indicate at least one attribute associated with the respective at least one content data.

The at least one flag to indicate the at least one attribute associated with the respective at least one content data may include information to indicate of whether a user operating the respective sending device liked the respective at least one content data record.

In some variations, a wireless communication device is disclosed. The wireless communication device includes one or more processors, a transceiver to receive wireless messages, and storage media including computer instructions. The computer instructions, when executed on the one or more processors, cause operations including monitoring a plurality of messages from a plurality of mobile devices, each of at least some of the plurality of messages including at least one identifier of at least one content data record, from a plurality of content data records, stored at least on a sending device sending the respective message, and data representative of number of times the at least one content data record was used on the respective sending device. The computer instructions further cause operations that include determining popularity metrics for one or more content data records from the plurality of content data records based on the data included in each of the at least some of the plurality of messages representative of the number of times the respective at least one content data record was used on the respective sending device.

Embodiments of the device may include at least some of the features described in the present disclosure, including at least some of the features described above in relation to the method.

In some variations, an apparatus is disclosed. The apparatus includes means for monitoring a plurality of messages from a plurality of mobile devices, each of at least some of the plurality of messages including at least one identifier of at least one content data record, from a plurality of content data records, stored at least on a sending device sending the respective message, and data representative of number of times the at least one content data record was used on the respective sending device. The apparatus further includes means for determining popularity metrics for one or more content data records from the plurality of content data records based on the data included in each of the at least some of the plurality of messages representative of the number of times the respective at least one content data record was used on the respective sending device.

Embodiments of the apparatus may include at least some of the features described in the present disclosure, including at least some of the features described above in relation to the method and the device, as well as one or more of the following features.

The means for determining the popularity metrics for the one or more content data records from the plurality of content data records may include means for determining the sum of the times each of the one or more content data records was used on each sending device on which the respective each of the one or more content data records is stored, and means for determining a ratio of the sum of the times the each of the one or more of content data records was used on the each sending device on which the respective each of the one or more content data records is stored, and number of sending devices on which the respective each of the one or more content data records is stored.

The apparatus may further include means for downloading one of the plurality of content data records associated with a popularity metric exceeding a pre-determined popularity threshold.

The means for downloading the one of the plurality of content data records may include means for performing operations, in response to a determination that number of locally stored content data records exceeds a pre-determined capacity threshold, including identifying a locally stored content data record associated with a corresponding popularity metric representative of the identified locally stored content data record being the least popular from the locally stored content data records, and replacing the identified locally stored content data with the one of the plurality of the content data records when the identified locally stored content data record is determined to be less popular than the one of the plurality of content data records.

The apparatus may further include means for adjusting at each sending device the number of times each of the data content records stored on the respective each sending device was used.

The means for adjusting at the each sending device the number of times the each of the data content records stored on the respective each sending device was used may include means for incrementing the number of times a particular data content record, stored on a particular sending device, was viewed when, for example, at least 50% of the particular data content record was presented on the particular sending device, and/or the particular data content record was presented on the particular sending device for a period of time exceeding a pre-determined period.

The means for adjusting at the each sending device the number of times the each of the data content records stored on the respective each sending device was used may include means for reducing the number of times a particular data content record stored on a particular sending device when the particular data content record was last presented on the particular device more than a pre-determined period.

In some variations, a non-transitory processor readable media programmed with a set of instructions executable on a processor that, when executed, cause operations including monitoring a plurality of messages from a plurality of mobile devices, each of at least some of the plurality of messages including at least one identifier of at least one content data record, from a plurality of content data records, stored at least on a sending device sending the respective message, and data representative of number of times the at least one content data record was used on the respective sending device. The instructions cause further operations including determining popularity metrics for one or more content data records from the plurality of content data records based on the data included in each of the at least some of the plurality of messages representative of the number of times the respective at least one content data record was used on the respective sending device.

Embodiments of the processor readable media may include at least some of the features described in the present disclosure, including at least some of the features described above in relation to the method, the device, and the apparatus.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, is meant to encompass variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, is also meant to encompass variations of ±20% or ±10%, ±5%, or +0.1% from the specified value, as such variations are appropriate to in the context of the systems, devices, circuits, methods, and other implementations described herein.

As used herein, including in the claims, "or" and "and" as used in a list of items prefaced by "at least one of" or "one or more of" indicates that any combination of the listed items may be used. For example, a list of "at least one of A, B, or C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, or C" may also include AA, AAB, AAA, BB, etc.

As used herein, including in the claims, unless otherwise stated, a statement that a function, operation, or feature, is "based on" an item and/or condition means that the function, operation, function is based on the stated item and/or condition and may be based on one or more items and/or conditions in addition to the stated item and/or condition.

Unless defined otherwise, all technical and scientific terms used herein have the same meaning as commonly understood by one of ordinary skill in the art to which this disclosure pertains.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference symbols in the various drawings indicate like elements.

DETAILED DESCRIPTION

The description set forth below in connection with the appended drawings is intended as a description of various configurations and is not intended to represent the only configurations in which the concepts described herein may be practiced. The description includes details for the purpose of providing an understanding of various concepts. However, these concepts may be practiced without these specific details.

Disclosed herein are methods, systems, devices, apparatus, products, and other implementations, including a method of that includes monitoring a plurality of messages/communications from a plurality of mobile devices, with each of at least some of the plurality of messages including at least one identifier of at least one content data record, from a plurality of content data records, stored at least on a sending device sending the respective messages, and data representative of number of times the at least one content data record was used on the respective sending device. The method also includes determining popularity metrics (e.g., a popularity index) for one or more content data records from the plurality of content data records based on the data included in each of the at least some of the plurality of messages representative of the number of times the respective at least one content data record was used on the respective sending device. The plurality of mobile devices may constitute a peer-to-peer system, such as a "Borrego" P2P system, that uses broadcast beacon advertisements, communicated by the devices of the system, to advertise content available for download from the various devices in the system. Devices deployed in the P2P system thus monitor messages/beacon advertisements from the various sending devices for content that is stored on those sending devices, and depending upon their need, establish a connection with one or more of the devices to download content.

Figure 1:
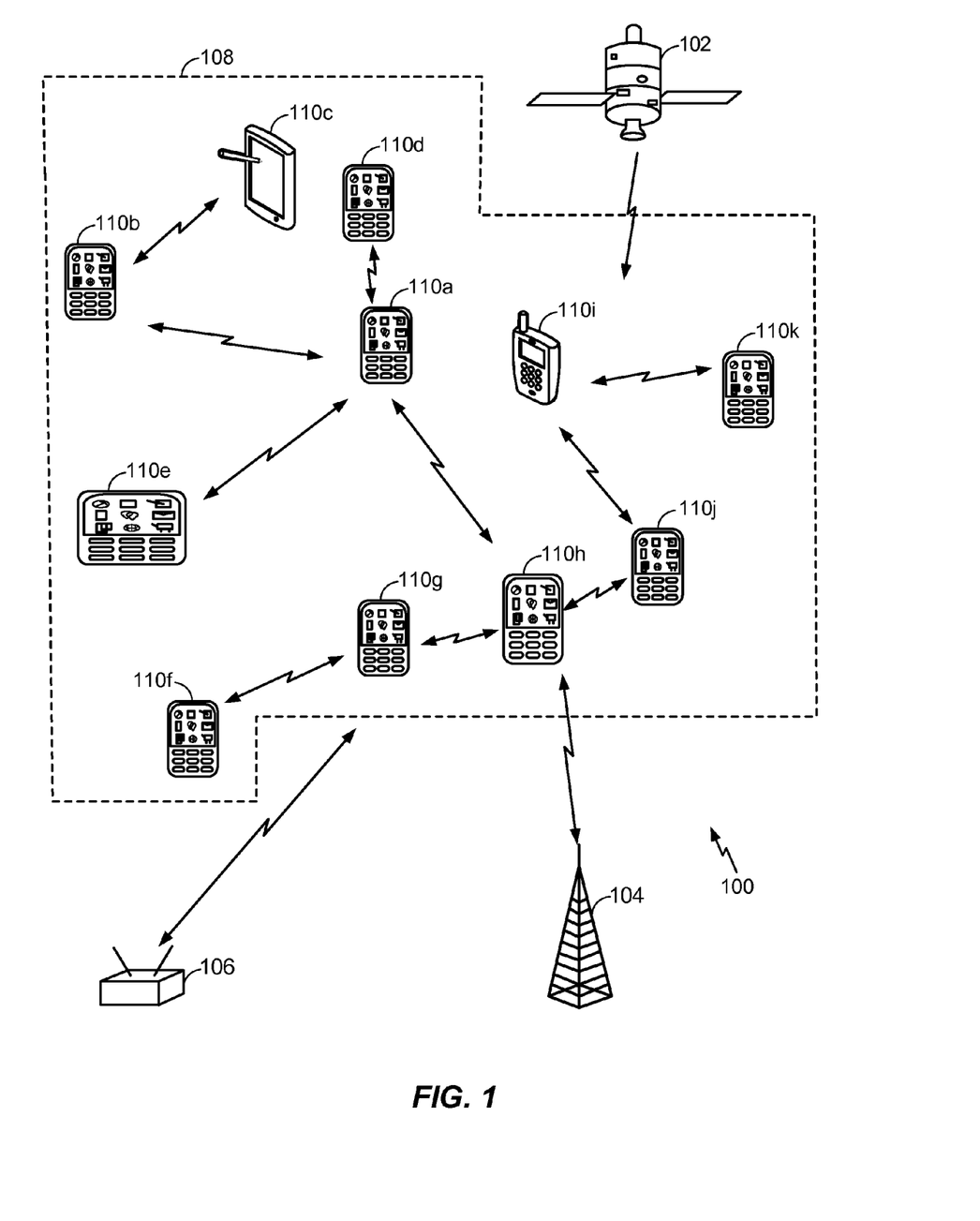
FIG. 1 is a schematic diagram of an operating environment that includes a peer-to-peer ("P2P") network or system.

Thus, with reference to FIG. 1, a schematic diagram of an operating environment 100 that includes a peer-to-peer system 108 (also referred to as a "P2P" system or network) is shown. In a P2P system each device, such as any of the devices 110a-k of the network, can establish communication links with one, some, or all of the other devices in the system, and is configured to serve as a client or server for any of those other devices, allowing those other devices access to its resources (content, applications executing on the device, hardware operating on the device, etc.) A P2P is thus configured to enable communication, resource sharing and resource management without requiring a central server. As will be described in greater details below, at least one of the devices of the example P2P system 108 is configured to receive content from at least one other of the devices 110a-k, including to monitor a plurality of messages from a plurality of devices, with each of at least some of the plurality of messages including at least one identifier of at least one content data record stored at least on a sending device sending the respective communication and data representative of number of times the at least one content data record was used on the respective sending device. Such a device is also configured to determine popularity metrics for content data records based on the data included the at least some of the plurality of messages that is representative of the number of times the respective at least one content data record was used on the respective sending device. Each of the devices 110a-k may be configured to communicate with one, some, or all of the mobile devices constituting the P2P system through one or more communications technologies/protocols. For example, a particular one of the devices 110a-k may transmit or broadcast advertisements/messages (or control messages) that include information about content available on that particular device via such communication technologies as Bluetooth Low Energy (BLE), WiFi Direct, etc., and transmit content, to another P2P device (which may have requested content or access to resources on the particular transmitting device) using larger capacity communications links (e.g., via WiFi links, such as WiFi Direct links). Other types of communication protocols/technologies to communicate advertising messages and/or for large scale data transfers within a P2P system may also be used.

As further shown in FIG. 1, one or more of the devices 110a-k in the P2P system 108 may be configured to operate and interact with multiple types of other communication systems/devices, including local area network devices (or nodes), such as WLAN for indoor communication, femtocells, Bluetooth-based transceivers, and other types of indoor communication network nodes, wide area wireless network nodes, satellite communication systems, etc., and as such the one or more of the devices 110a-k may include one or more interfaces and/or transceivers to communicate with the various types of communications systems. As used herein, communication systems/devices with which the one or more of the P2P devices of the system 108 may communicate with are also referred to as access points (AP's).

For example, the operating environment 100 (that includes the P2P system 108) may include a Local Area Network Wireless Access Points (LAN-WAP) 106 that may be used for wireless voice and/or data communication with one or more of the P2P devices 110a-k. In some embodiments, the LAN-WAP 106 may also be utilized, in conjunction with one or more other access points (which may be based on similar communication technology to that implemented at the access point 106) as an independent source of position data, e.g., through implementation of multilateration-based procedures based, for example, on time of arrival techniques. The LAN-WAP 106 can be part of a Wireless Local Area Network (WLAN), which may operate in buildings and perform communications over smaller geographic regions than a WWAN. Additionally in some embodiments, the LAN-WAP 106 could also be pico or femto cells. In some embodiments, the LAN-WAPs 106 may be part of, for example, WiFi networks (802.11x), cellular piconets and/or femtocells, Bluetooth Networks, etc. The LAN-WAPs 106 can also include a Qualcomm indoor positioning system (QUIPS™). A QUIPS implementation may, in some embodiments, be configured to obtain data particular floor or for some other region where the mobile device is located. Although one (1) LAN-WAP access point is depicted in FIG. 1, any number of such LAN-WAP's may be used, and, in some embodiments, the operating environment 100 may include no LAN-WAPs access points at all. Furthermore, the LAN-WAP 106 depicted in FIG. 1 may be a moveable node, or may be otherwise capable of being relocated.

As further shown in FIG. 1, the operating environment 100 may also include, in some embodiments, at least one Wide Area Network Wireless Access Point (WAN-WAP) 104, which may be used for wireless voice and/or data communication, and may also serve as another source of independent information through which one or more of the devices 110a-k in the P2P system 108 may determine its position/location. The WAN-WAP 104 may be part of wireless wide area network (WWAN), which may include cellular base stations, and/or other wide area wireless systems, such as, for example, WiMAX (e.g., 802.16). A WWAN may include other known network components which are not shown in FIG. 1. Typically, a WAN-WAP, such as the WAN-WAP 104, may operate from fixed positions, and provide network coverage over large metropolitan and/or regional areas. Although here too only one (1) WAN-WAP is illustrated in FIG. 1, any number of such WAN-WAPs may be used. In some embodiments, the operating environment 100 may include no WAN-WAPs at all. Additionally, the WAN-WAP 104 depicted in FIG. 1 may be a moveable node, or may otherwise capable of being relocated.

Communication to and from one or more of the mobile devices 110a-k of the P2P system 108 (to exchange data with one or more access points, enable position determination of devices of the P2P system 108, etc.) may thus also be implemented, in some embodiments, using various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may also be implemented, at least in part, using an IEEE 802.11x network, and a WPAN may be a Bluetooth network, an IEEE 802.15x, or some other type of network. The techniques described herein may also be used for any combination of WWAN, WLAN and/or WPAN.

In some embodiments, and as further depicted in FIG. 1, one or more of the devices 110a-k of the P2P system 108 may also be configured to at least receive information from a Satellite Positioning System (SPS) 102, which may be used as an independent source of position information for the one or more of the devices 110a-k of the system 108. Although only one (1) satellite 102 is illustrated in FIG. 1, any number of such satellites may be used. Devices configured to receive satellite communications may include one or more dedicated SPS receivers specifically designed to receive signals for deriving geo-location information from the SPS satellites. Thus, in some embodiments, the one or more of the P2P devices 110a-k may communicate with any one or a combination of the SPS satellite 102, the WAN-WAP 104, and/or the LAN-WAP 106. In some embodiments, each of the aforementioned systems can provide an independent information estimate of the position for the one or more of the devices 110a-k using different techniques. For example, when deriving position using the access points 104 and/or 106, or using the SPS 102, the one or more devices of the P2P system 108 may utilize time of arrival techniques (optionally with the assistance of a positioning server, not shown in the figure). In some embodiments, the one or more of the devices 110a-k may combine the solutions derived from each of the different types of access points to improve the accuracy of the position data.

In embodiments in which the one or more of the mobile devices 110a-k can receive satellite signals, the mobile device may utilize a receiver (e.g., a GNSS receiver) implemented for use with the SPS to extract position data from a plurality of signals transmitted by SPS satellites (such as the satellite 102 depicted in FIG. 1). Transmitted satellite signals may include, for example, signals marked with a repeating pseudo-random noise (PN) code of a set number of chips and may be located on ground based control stations, user equipment and/or space vehicles. Satellite positioning systems may include such systems as the Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like.

As described herein, the devices 110a-k, which are configured to implement peer-to-peer communication (and thus may be referred to as P2P devices), may include mobile devices or stations (MS) that may be cellular or other types of wireless communication devices, personal communication system (PCS) devices, personal navigation devices (PND), Personal Information Manager (PIM) devices, Personal Digital Assistant (PDA) devices, tablet devices, laptops or some other suitable mobile devices which are capable of receiving wireless communication and/or navigation signals, such as navigation positioning signals. The term "mobile station" (or "mobile device") is also intended to include devices which communicate with a personal navigation device (PND), such as by short-range wireless, infrared, wireline connection, or other connection, regardless of whether satellite signal reception, assistance data reception, and/or position-related processing occurs at the device or at the PND. Also, "mobile station" is intended to include all devices, including wireless communication devices, computers, laptops, tablet, etc., which are capable of communication with a server, such as via the Internet, WiFi, or other network, regardless of whether satellite signal reception, assistance data reception, and/or position-related processing occurs at the device, at a server, or at another device associated with the network. Any operable combination of the above are also considered a "mobile device" or "mobile station."

Figure 2:
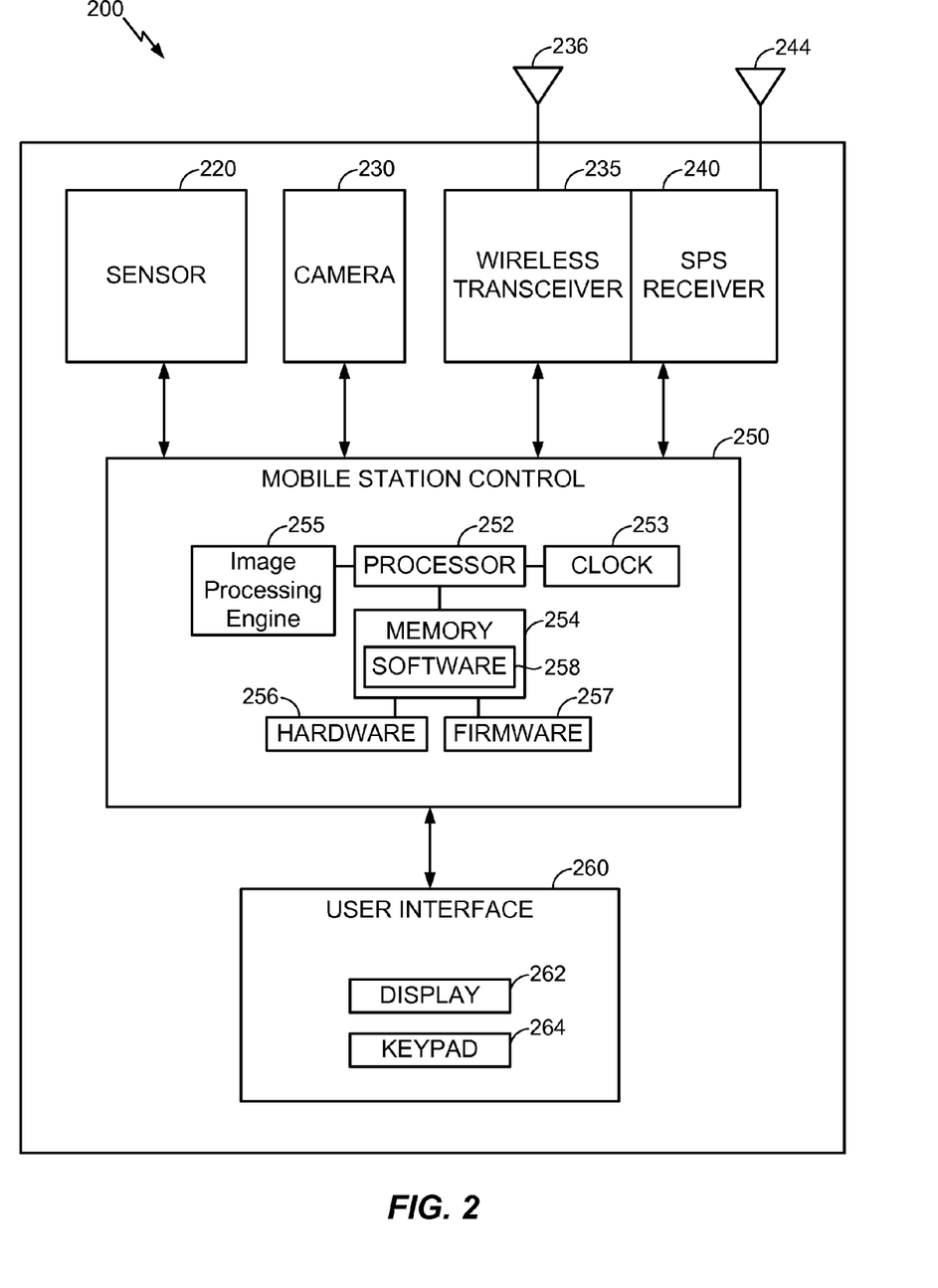
FIG. 2 is a block diagram of a mobile device that may be configured to operate in a P2P system.

With reference now to FIG. 2, a block diagram of a mobile device 200, which may be similar to any one of the devices 110a-k depicted in FIG. 1, is shown. As illustrated in FIG. 2, the mobile device 200 may include at least one sensor (e.g., an orientation/inertial sensor) 220, which may be, e.g., a magnetometer, an accelerometer (e.g., a 3D accelerometer), a gyroscopes, etc. Although only one sensor is depicted, additional sensors may be included with the device 200. The mobile station may further include an image capturing device, such as a camera 230 (e.g., a charge-coupled device (CCD)-type camera, CMOS-type camera, etc.), which may produce still or moving images (e.g., a video sequence) that may be displayed on a user interface device, such as a display or a screen.

The mobile device 200 may include a receiver 240, such as a satellite positioning system (SPS) receiver that receives signals from a SPS satellites (such as the satellite 102 of FIG. 1) via an antenna 244. The mobile device 200 may also include at least one wireless transceiver 235, which may be, e.g., a cellular modem or a wireless network radio receiver/transmitter configured to send and receive communications to and from one or more wireless access points (such as any of LAN-WAP 106 and/or the WAN-WAP 104), to send and receive messages/communications with peer devices in a P2P system, and/or to send and receive messages/communications with any other type of network node configured for wireless/cellular communication. Communication to and from the wireless transceiver may be enabled via a dedicated antenna 236, via the antenna 244, or via some other antenna. In some implementations, the mobile device 200 may include separate transceivers that serve as the cellular modem and the wireless network radio receivers/transmitters, and may include multiple dedicated transceivers that may communicate in dedicated communication modes/protocols. For example, in some implementations, where a device such as the device 200 to communicate in a P2P system, one transceiver may be configured to enable communications in a communication mode intended to communicate advertisement and/or other types of control messages (e.g., a communication mode such as Bluetooth Low Energy, or BLE, to transmit/broadcast and/or receive advertisement messages containing information representative of, in part, content available on transmitting devices). Another transceiver of the device 200 may be configured to enable communication in a communication mode intended to communicate large volume of data (e.g., a communication mode such as WiFi, for example, WiFi Direct, to transmit and/or receive content available on devices within a P2P system).

The SPS receiver 240 and the at least one wireless transceiver 235 (as well as other units/modules of the device 200, such as the at least one sensor 220, the camera 230, etc.) are connected to, and communicate with, a mobile device controller 250. The controller 250 is configured, for example, to process communication data received via the at least one wireless transceiver 235, to manage and control its communications with various remote devices (such as P2P remote devices similar to the devices 110a-k depicted in FIG. 1), to control operation of the various on-board units/modules of the device 200, as well as the general operation of the mobile device 200. For example, and as will be described in greater detail below, in some embodiments, the controller 250 is configured to monitor a plurality of messages from a plurality of mobile devices, with some of those monitored messages including data identifying content available on the devices from which the monitored messages were received. The monitored communications may also include data representative of number of times the content data available on the respective sending devices from which the monitored messages were received was used on the respective sending devices. The controller 250 of the device 200 may also be configured to determine popularity metrics for one or more content data records identified in the monitored messages based on the data included in the monitored communications representative of the number of times the content data at the respective sending devices was used by/on the respective sending device. The controller 250 of the device 200 may be configured to also control the downloading of content data from the various P2P devices in communication with the device 200 based on the determined respective popularity metrics for the various content records with respect to which sending devices have been transmitting advertisements/control messages. For example, the controller may cause a particular content record from one remote device to be downloaded (e.g., by sending a request to that one remote device) in response to a determination that the popularity metric associated with that content record exceeds a pre-determined popularity threshold. In situations where the mobile device 200 can also send content and/or share other of its own resources with one or more devices (e.g., devices in a P2P system such as the system 108), the controller 250 may be configured to cause transmission of advertisements advertising content available on the device 200 for peer-to-peer distribution, and to transmit one or more of its locally stored content data records (e.g., video and/or audio files, various documents, etc.) in response to, for example, receipt of a request from a P2P device in communication with the device 200 to transmit a particular content data record to that P2P device (this may happen, for example, when it was determined that the popularity metric of the record requested to be sent to the P2P device, as computed on that P2P device, was determined to exceed some pre-determined popularity threshold). An advertisement transmission sent by such a sending device may include at least one identifier of at least one content data record, from a plurality of content data records, stored at least on such a sending device, and data representative of number of times the at least one content data record was used on the that sending device. Based on the advertisements transmitted by such a sending device, as well as one or more other advertisement messages transmitted by other sending devices, a receiving device receiving advertisement messages can determine popularity metrics for one or more content data records from the plurality of content data records based on the data included in received advertisement messages representative of the number of times respective at least one content data record identified in the received messages were used on the respective sending devices.

The controller 250 may include, in some implementations, a processor 252 and associated memory 254, a clock 253, hardware 256, software 258, and firmware 257. The mobile station controller 250 may further include, in some embodiments, a dedicated image processing engine 255, which is illustrated separately from processor 252 for clarity, but which may constitute part of the processor 252. The processor 252 may, but need not necessarily include, one or more microprocessors, embedded processors, controllers, application specific integrated circuits (ASICs), digital signal processors (DSPs), and the like. As used herein the term "memory" refers to any type of non-transitory computer storage medium, including long term, short term, or other memory associated with the mobile station, and is not to be limited to any particular type of memory or number of memories, or type of media upon which memory is stored. Further details regarding an example embodiment of a processor or computation system, which may be similar to the processor 252, are provided below in relation to FIG. 6.

The mobile device 200 may also include a user interface 260 that is in communication with the controller 250, e.g., the controller 250 may accept data and control the user interface 260. The user interface 260 includes a display 262 that may display images, including images produced by the camera 230. The display 262 may further display control menus, positional information, information about content available in a P2P system, present content stored locally on the device 200 (e.g., at the memory 254), etc. The user interface 260 further includes input interface devices, such as, for example, a keypad 264, a touch screen (not shown), a microphone and speaker (not shown), or other input device through which the user can input information into the mobile station 200.

Figure 3:
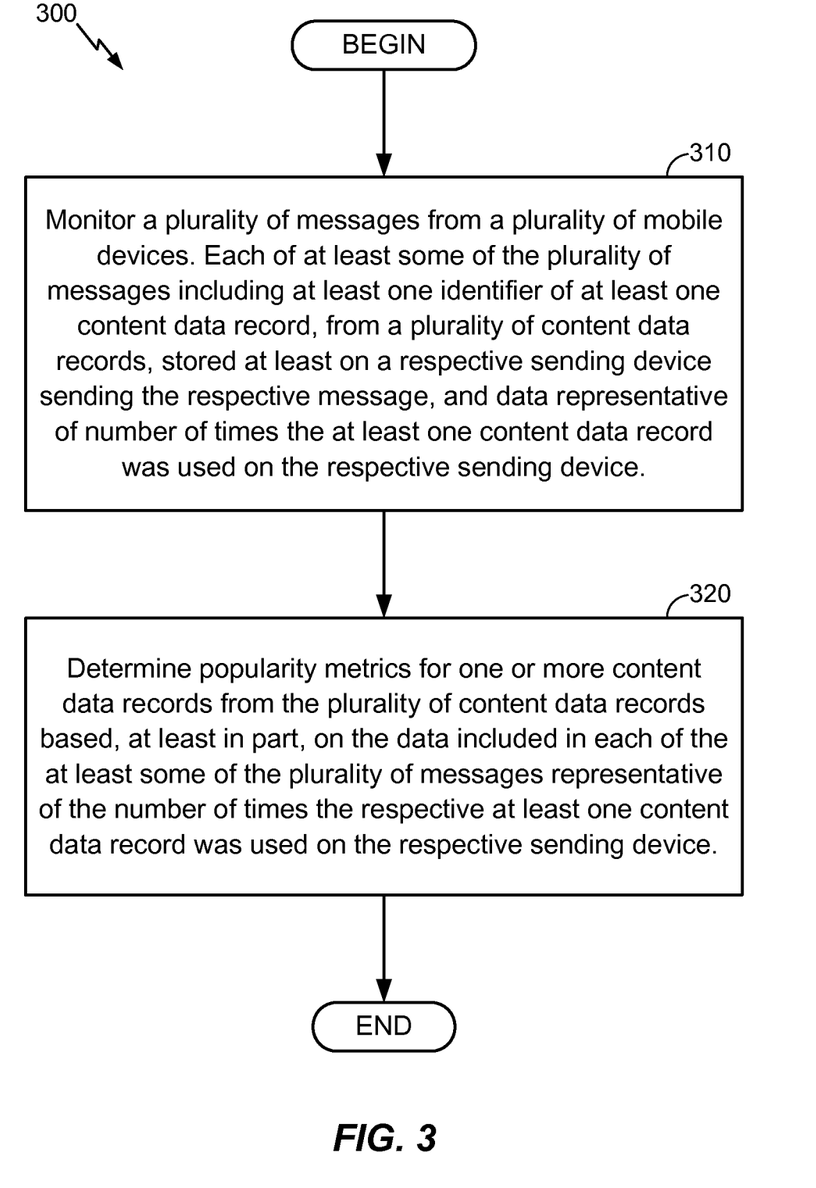
FIG. 3 is a flowchart of an example procedure to monitor content available in a P2P system and determine popularity metrics therefor.

Discussion of at least some of the functionality of an individual device, such as any of the devices 110a-k of FIG. 1 and/or the mobile device 200 of FIG. 2, to identify popular content on other devices and obtain such content is provided with further reference to FIG. 3, showing a flowchart of an example procedure 300. The procedure 300 includes monitoring 310 a plurality of messages (e.g., receiving the plurality of messages, decoding the information stored on them, and/or otherwise processing them) from a plurality of mobile devices (e.g., the devices 110a-k of the P2P system 108 of FIG. 1). At least some of the messages being monitored may be messages with information regarding content available at various devices in the P2P system. Each such message (advertising content) includes at least one identifier of at least one content data record (from a plurality of content data records) stored at least on a corresponding sending device sending the respective message, and data representative of number of times the at least one content data record was used on the respective sending device.

Figure 4:
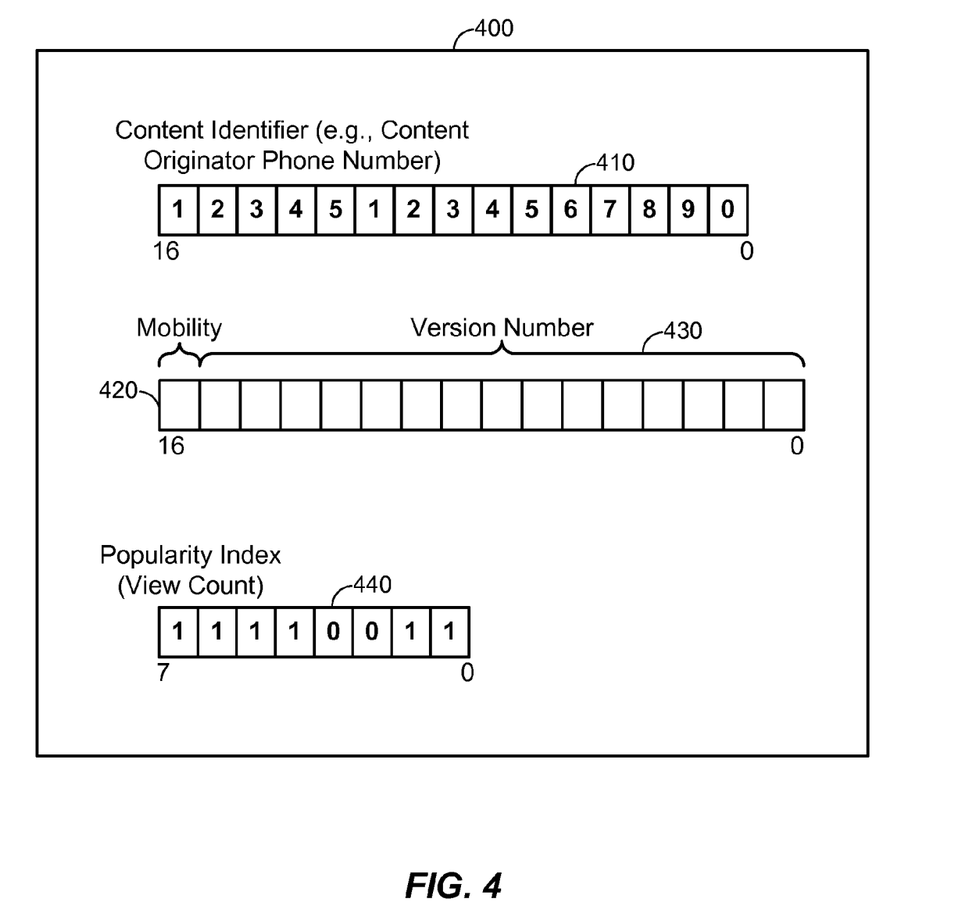
FIG. 4 is a diagram of an example message to advertise content with at least some information fields that may be included in the message.

For example, consider FIG. 4, showing at least some of the information fields that may be included with an example message/communication 400 of the kind that may be transmitted or broadcast to various devices in a P2P system to advertise content. This message, also referred to as a beacon, advertisement, communication, control message, etc., includes one or more fields containing meta data in relation to content being advertised by a device of the P2P system. As illustrated in FIG. 4, one example field of the message 400 is a field for content identifier 410. In some embodiments, the content identifier 410 may include the content originator's phone number to identify the various contents available for distribution in the system by the phone number associated with the device from which the content record associated with the message 400 was first disseminated/distributed. In situations where a particular originator may have distributed multiple content data records, further identification data, e.g., a number or value to distinguish one data record distributed by a particular device from another data record distributed by the same particular device, may be included with the message as an augmentation to the content identifier field. In some embodiments, the content identifier field of the message may also include an identification value to identify the device currently advertising the associated content. In such embodiments, the identifier field 410 may thus include the originating device (and optionally an additional identifier to identify one of a plurality of contents originated by that device), as well as an identifier representative of the current device on which that content is stored (e.g., because that content record was previously distributed to that device from another device that had that content record). Other types of identifiers, and other content identification schemes and formats may also be used to identify the various contents stored on various devices within a P2P system that are available for distribution to other devices within the network. For example, in some implementations, unique identification numbers, e.g., to identify an operator rather than a device, that are not associated with the identity of the device(s) distributing the content, may be assigned to respective content records. In some embodiments, data describing the content associated with the particular communication (e.g., a descriptive title of the content record) may also be included/augmented to the content identifier field 410.

As further shown in FIG. 4, the message 400 may also include a mobility field 420. In some embodiments, the mobility field 420 may be a 1-bit field (or larger) to indicate whether the device sending the communication 400 is a stationary device (e.g., an access point, or a mobile device that has not changed its location, as determined by a location determination procedure, over some pre-determined interval of time). The mobility field may facilitate determining which device a listening device (i.e., a device to which content is to be downloaded) may select to request that the particular advertised content to be sent to it. For example, when a particular content record is available from two devices, and one of those devices is moving while the other device is stationary, the listening device may prefer to receive the content record in question from the stationary device. Another data field that may be included in the message 400 is a version field 430. In some embodiments, the version number may include information to distinguish different content originating from the same device. For example, different text data contents authored by a particular operator (or originating from the same device) may be assigned different version numbers to distinguish one content from another.

As further shown in FIG. 4, in some embodiments, the message 400 may also include a field for popularity index 440 representative of the extent of use of the at least one content record associated with the message 400. The popularity index indicated in the field 440 may be a use counter that indicates how many times the associated at least one content data record (stored on the device sending the advertising message 400) was used by that sending device. In some implementations, a content record is deemed to have been used when it is viewed by a user using the device. In some variations, a content record (corresponding to the meta data contained in the advertising message) is deemed to have been viewed if/when, for example, at least 50% (or some other pre-determined percentage) was presented on an output user interface of the device (e.g., a video record presented on a display of the sending device, signals of an audio record sent to an audio port of the device, etc.) In some variations, a content record is deemed to have been used when the record was presented on the respective sending device for a period of time exceeding some pre-determined period (e.g., 3 seconds, or some other duration). Another example of "use" of an associated content data record may include distributing the content data record to another device (e.g., in response to a request by the other device to send it the content data record, in accordance with the procedures described herein). Other types of uses are also possible.

Alternatively and/or additionally, in some embodiments, the popularity index value contained in the popularity index field 440 may include a value representative of a popularity metric derived by the sending device. Thus, the sending device may have previously computed a popularity metric for the particular at least one content record that is being advertised, and based on that previously computed popularity metric the sending device may have downloaded the content record for storage in its memory. Computation of the popularity metric for that content record may have been performed based on procedures similar to those described herein. The previously computed popularity index, or an adjusted value thereof, may be included in the popularity index field 440 of a transmitted/broadcast advertisement from that sending device in addition to, or instead of, a use counter. For example, in some embodiments, the popularity index field 440 may include a previous popularity metric previously computed by the sending device prior to the downloading of the associated content data record to the sending device, and also include a value representative of subsequent uses of the downloaded content data record by that sending device. The value included in the popularity index of the advertisement/beacons received by a listening device may then be used to locally derive/compute (i.e., at the listening device) the popularity metric based on which a determination is made whether to download from the sending device that transmitted the advertisement message the at least one content record associated with the received message from the sending device.

The message 400 of FIG. 4 may include, in some embodiments, additional fields and information regarding content available at P2P device of a P2P system. For example, when a particular device or operator is associated with multiple content data records (e.g., a particular device or operator may have originated multiple content data records), a media content field (also referred to as a content identifier field) may be used to hold information identifying the particular content data records from the multiple content data records associated with the particular device(s) or operator(s) identified by the content identifier field 410 of the message 400. Thus, if a particular operator, identified by a unique identification number that can be included in the field 410 of the message 400, originated three different content data records, the three content records may be identified as, for example, 1, 2, and 3, which, in combination with the identification number contained in the field 410, can uniquely identify the content being advertised by the sending device.

Additional fields may also include one or more of the following fields:
  Content type—The information contained in this field may include short descriptions of the type of content or resources being advertised by the sending device, e.g., system content, ads, media content, listings of personal information (for example, listing of friends), etc.
  Origin time stamp—Information in this field may include a time stamp corresponding to when the content being advertised was originally created.
  Received time stamp—Information contained in this field may include a time stamp corresponding to when the content being advertised by the message was received by the sending device (in circumstances when such content was downloaded from another device). In situations where the content advertised was created at the sending device, the receive time stamp may be the same as the origin time stamp.
  Mime type—Information contained in this field indicates the type of content being advertised, e.g., audio, video, etc. Information in this field may also indicate the file format for the corresponding content.
  Channel—Information contained in this field indicates the channel/content category the content pertains to, e.g., news, education, government, religion, astrology, sports, cricket, wildcard, etc.

Further types of information and fields that may be included in the message 400 may also be used. As a further example, in some embodiments, the advertisement messages may also include a "liked" (or some similar attribute) field or flag indicative of whether the advertising operator liked the content or not. This flag, when monitored in by listening devices, can be used to determine the proportion (e.g., in terms of a percentage) of users/operators that liked or disliked the associated content. Thus, in some embodiments, advertising messages, which may be configured in a manner similar to the configuration of the message 400, may include at least one flag associated with at least one content data record to indicate at least one attribute associated with the at least one content data. The at least one flag may include information to indicate of whether a user operating the respective sending device liked the at least one content data record. Use of a "like" flag may be used to sort content (stored on the device, or content advertised) according to content that is "liked" (e.g., its "liked" percentage exceeds some pre-determined value, e.g., 50%) and content that is "unliked" (e.g., the "liked" percentage is less than some pre-determined value).

As noted, the devices receiving and monitoring messages/communications sent by the various devices of a P2P network (such as the system 108) are configured, without using a central server, to identify content available in the system/network, keep track of the available content available throughout the system/network, and keep track of the contents' respective popularity. Thus, turning back to FIG. 3, the example procedure 300 also includes determining 320 (e.g., by the listening device monitoring the messages/communications advertising the content available in a system such as the P2P system 108) popularity metrics for one or more content data records (associated with the monitored communications) based, at least in part, on the data included in each of the at least some of the plurality of communications/messages (such communications/messages being configured, for example, similarly to the message 400 of FIG. 4) representative of the number of times the respective content data records were used on the respective sending devices that store and advertise those content records.

Accordingly, in some of the implementations described herein, sending devices of a P2P system/network communicate advertisement messages/communications that each includes information to identify at least one content data record stored on the respective sending devices (e.g., identifier information, such as information included in a content identifier field, an originator's ID field, etc.), and data (included in a field such as the popularity index field 440 of FIG. 4) representative of number of times the at least one content data record was used (e.g., "viewed") on the respective sending devices.

The listening device listening/monitoring advertisements messages/communications communicated within the P2P system can thus track from these messages the content available in the P2P system and locally compute (e.g., at the device itself) a metric indicative of the popularity the content has, or is, gaining within the system. In some embodiments, once a certain threshold of popularity has been attained, the listening device may determine whether to download content from one of the devices advertising that particular content.

Thus, for example, for each public content j (which may be identified by one or more of the content's ID number, the content's originator phone number or operator number, etc.), and for each sending device (or operator/user) i advertising that content, the listening device keeps track of $V_{ij}$, where $V_{ij}$ is the use/view count for the $j^{th}$ content on the $i^{th}$ device (as advertised on the beacons sent by the $i^{th}$ device or operator). In other words, a particular content j stored on a particular sending device i, will be associated with a value $V_{ij}$ (maintained on the listening device that monitors the various advertisement messages/communications) indicating, for example, how many times the associated content was used (e.g., viewed) on the $i^{th}$ sending device (or $i^{th}$ operator/user). The value $V_{ij}$ can be updated to account for subsequent uses of any of the contents. The receiving/listening device may also be configured to keep track of the time of last update for each $V_{ij}$. If the time of last update for a particular content is more than a predefined time (e.g., 1 week), $V_{ij}$ may be reduced by some pre-determined value (e.g., 1) to reflect waning popularity, and to update the time of last update to the current time. A reduced value of the corresponding $V_{ij}$ will result in a reduced popularity metric, as will become apparent below. If there are no new uses for that particular content by the associated device or operator i for another period equal to the pre-defined time period, the value of the respective Vij will again be decremented to further capture the decreasing use (and thus potentially decreasing popularity) of the particular content j.

Thus, a receiving/listening device may update any of the records Vij it maintains in at least one of three ways: a) when the listening device comes across another advertisement message/communication from the $i^{th}$ device/operator for the content j; b) when the listening device downloads the content j from another device x that has come across a more recent updated Vij, and the listening device and the device x update each other's metrics; and/or c) when the time since last update (of Vij) has exceeded a predefined time period and the listening device consequently updates (e.g., decreases Vij) on its own.

In some embodiments, a listening device may compute a popularity metric associated with a particular content j according to:

$$POP_j = \frac{\sum V_{ij}}{N(V_{ij})}$$

where $POP_j$ is the popularity metric for the $j^{th}$ content data record, Sigma Vij (i.e., $\Sigma Vij$) is the sum of the values of the used/view counters maintained by the listening device for each content j, and N(Vij) is the number of such entries for a content j maintained at the listening device. Thus, in such embodiments, determining popularity metrics for one or more content data records from the plurality of content data records includes determining for each of the one or more content data records the sum of the times the each of the one or more content data records was used (e.g., viewed) on each sending device on which the respective each of the one or more content data records is stored, and determining a ratio of the sum of the times the each of the one or more content data records was used on the each sending device on which the respective each of the one or more content data records is stored, and number of sending devices (or number of operators of such sending devices) on which the respective each content data record is stored.

For example, assume a particular content j (e.g., a video clip) is stored at three separate sending devices, that are identified in the P2P system 108 depicted in FIG. 1 as devices 110b, d, and e (i.e., the i's corresponding to these devices are b, d, and e, or some other identifier values to uniquely identify these sending devices). Assume, for this example, that device 110b has used the content j 10 times, that device 110d has used the content j 7 times, and that device 110e has used the content j 16 times. In this example, the popularity index determined at a listening device, for example, the device 110a of FIG. 1, that received advertisement messages from all the three devices 110b, d, and e advertising the content j and indicating the number of uses of that content on them, may be computed as:

$$POP_j = (10+7+16)/3 = 11$$

This value may thus be used as the popularity metric for the content j as computed on the listening device 110a, and may be used to base various content control decision, e.g., downloading the content from one of the advertising devices, replacing a content data record already stored on the listening device with one of the non-resident (i.e., non-stored) content data records that are being monitored/tracked by the listening device, etc. Other processes and ways to compute a popularity metric for advertised content may also be used.

In some embodiments, an operator of a sending device may exercise discretion as to which content record the operator wishes to download. For example, a list of the various contents identified by the listening device from the messages monitored by it, and the content records' corresponding popularity metrics as derived by the listening device, may be generated and presented on an output interface (e.g., a display screen, an audio interface, etc.), and the operator of the listening device may then select any of the content records identified in the generated list (the operator's selection may be facilitated by the computed popularity metrics for the various contents identified through the device). Additionally and/or alternatively, in some embodiments, the listening device may automatically select content records based, for example, on the popularity metrics derived for the various content records identified by the listening device from the messages it monitored. For example, a content whose popularity index exceeds some pre-determined threshold (or is otherwise determined to have a certain level of popularity to trigger the downloading of the content) may be downloaded from one of the sending devices that advertised this content.

When a particular content record is selected for downloading (automatically or by the operator of the particular listening device), determination of which sending device to select as a source for downloading the desired content may be based on one or more criteria, including, for example, distance between the listening device and the various devices on which the particular content is stored (e.g., select the sending device, with the desired content, closest to the listening device), quality of the content record (e.g., select a device with a high definition version of the content), the most up-to-date record, whether a sending device is stationary or moving, etc. Which criteria and/or device-selection rules may be applied to enable the downloading of a content record may depend on the extent of the information provided in the messages monitored by the listening device. For example, if the criterion to be used to select the sending device is based on distance, content advertising messages sent by the sending devices may need to include location information of the various sending device. Thus, messages, such as the message 400 may need to include a field such as a device-location field (not shown in the diagram of FIG. 4) that contains location information of the device (the location of the sending devices sending the advertisement messages may be determined using one or more location-determination procedures, such as multilateration-based procedures, that enable determination of a device's location based on signals received from access points and/or satellites). In some embodiments, selection of the sending device from which to download a selected content data record may be based on a random selection of the devices identified as storing the content data record, based on selection of the device from which the advertisement message was first received by the listening device, based on selection of the first sending device with which the listening device can establish a communication link for the purpose of downloading the selected content data record, or based on any other selection scheme, rule, or criterion. In some embodiments, a listening device may only be able to request a particular record from sending devices that are defined as being the listening device's authorized contacts (e.g., devices designated as being "friends" of the listening device). In some embodiments, messages/advertisements advertising content may be received by a listening device only from sending devices that are determined to be authorized contacts of the listening device. On the other hand, in embodiments in which a listening device may be able to receive messages/advertisements from devices other than just authorized contacts, but can request and download content only from devices that are authorized contacts of the listening devices, the listening device may first need to add (e.g., subscribe to) a sending device that has content the listening device is requesting to download that is not available on the listening device's authorized contacts devices. As noted, in some implementations, a listening device may be able to download content from any device in the P2P network in which the listening device is deployed.

Once a sending device on which a selected content data record is stored has been selected, operations to obtain that content data record from the selected sending device are performed. As noted, in some embodiments, the transmission of large volume of data may be performed using a communication mode with a higher capacity than the communication mode used to transmit or broadcast messages advertising the content available in the P2P system/network (or to transmit other types of control messages). In some embodiments, WiFi communication links may be used to enable communication of content data between a selected sending device from which a desired content data recorded is to be downloaded and the target listening device. For example, in such embodiments, the advertisement messages/communications transmitted by sending devices (advertising their available content) may include WiFi node data details (e.g., arranged in one or more fields) to enable the listening device to establish a WiFi-based communication link with a selected sending device from which the desired content data is to be downloaded. WiFi node details received with advertisement messages may be stored, together with other pertinent data relating to content available in the devices constituting the P2P system, in a local database maintained on the receiving listening device. Upon selection of a content data record to be downloaded (e.g., in response to the popularity metric associated with that record exceeding a pre-defined threshold, or in response to selection of that record by the operator of the listening device), and determination of the sending device from which that selected content data record is to be downloaded, the listening device is configured to obtain the WiFi node details for the sending device that is to send that data record (e.g., retrieve the details from the database where the details are stored). The listening device may then send a request to the selected sending device, configuring the request based on the WiFi node details for that sending device (e.g., identifying in the request the WiFi node particulars of the selected sending device), and including in the request WiFi node details of the listening device. In response, if the selected sending device is available to establish a link with the listening device that sent the request (e.g., communication traffic involving the selected sending device does not exceed some pre-determined traffic threshold), the selected sending device may start sending the selected content data record via a WiFi link between the sending and listening device. Alternatively, in some implementations, the WiFi link establishment procedure may include several additional exchanges of control messages, e.g., transmission of an acknowledgement message from the selected sending device to the requesting listening device, before transmission of the content data record may commence.

In some embodiments, the devices of a P2P system (such as the devices of the P2P system 108) may be configured to maintain only a limited number of content records (e.g., due to device resource constraints, such as storage constraints, processing resources constraints, etc.). In such embodiments, one or more of the devices of the P2P system may be configured to automatically manage/control the content locally stored on them to determine whether to replace one stored content data record with another content data record that is to be downloaded from a remote sending device. For example, in some implementations, the one or more devices of the P2P system may be configured to replace its least popular resident public content (i.e., content stored locally on the listening device) with a non-resident content record whose popularity (determined and tracked according to, for example, the procedures described herein) is higher than that of the device's least popular content.

Figure 5:
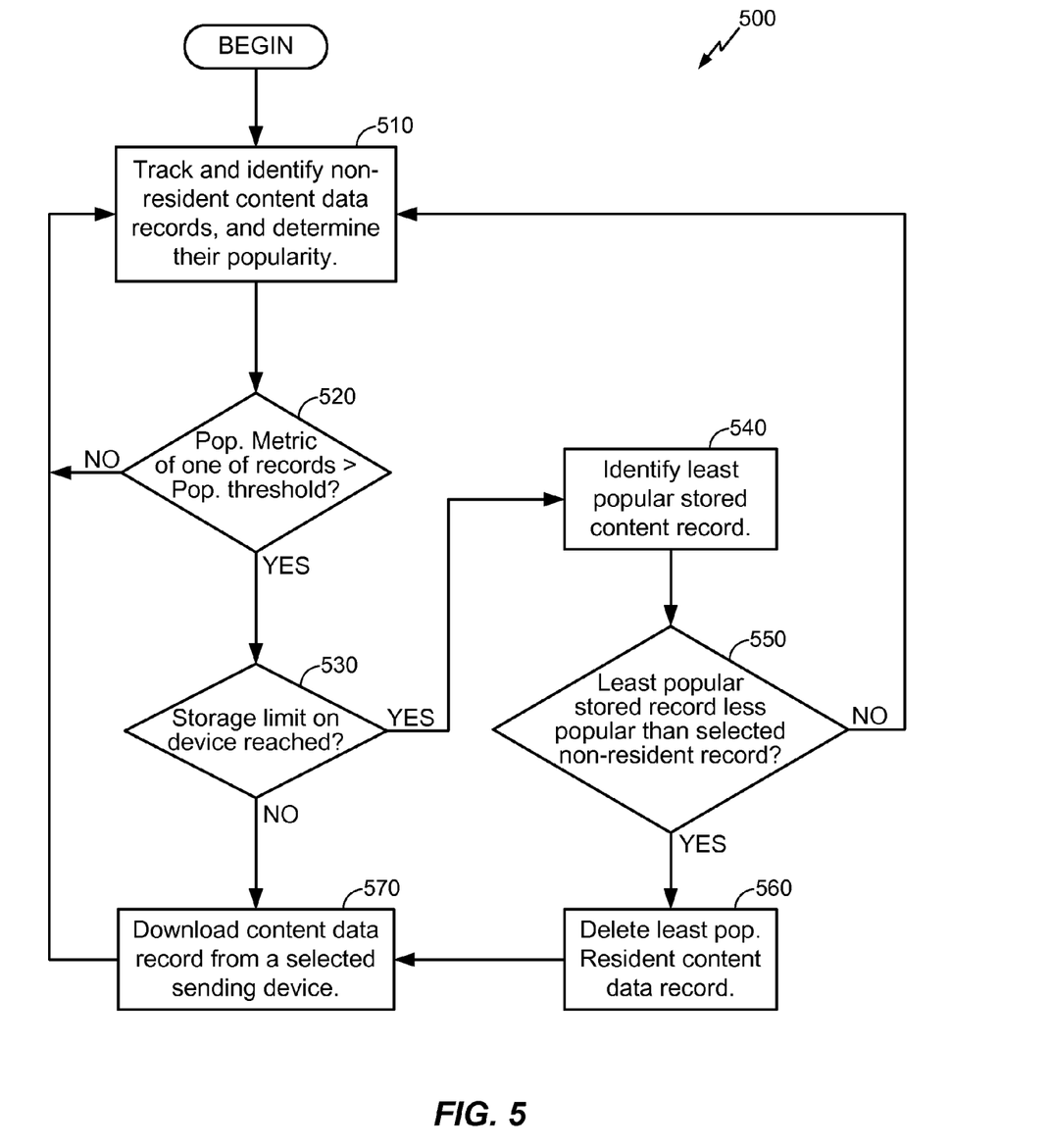
FIG. 5 is a flowchart of an example procedure to manage content data records stored on a device configured for communication in a P2P system.

Thus, with reference to FIG. 5, a flowchart of an example procedure 500 to control the content stored on a device (such as any of the devices 110*a-k* of FIG. 1) is shown. As noted, a listening device identifies and tracks 510 non-resident content data records based on messages sent by various sending devices advertising their content that is available for distribution, and determines for the identified content data records respective popularity metrics (also at 510), e.g., based on their use at the sending devices. In response to a determination that a non-resident content data records is to be downloaded from a sending device (e.g., when the popularity metric of that content data record, as determined 520 by the listening device, exceeds a predefined popularity threshold), a determination is made 530 whether the limit of the number of locally stored records (e.g., public records) has been reached (e.g., 100 records, 500 records, or any other pre-determined limit). If the limit has not been reached, the selected non-resident content data record is downloaded 570 from a sending device on which that particular content data record is stored (if more than one sending device stores that record, the listening device is configured to select one of those sending device according to, for example, a device selection procedure described above). If the limit has been reached, the listening device is configured to identify 540 from its stored content records (e.g., stored public content data records) the least popular content record, e.g., by accessing the popularity metrics associated with the stored content data records and identifying the smallest popularity metric value. In some embodiments, popularity of stored (resident) content may be based on self use counts (e.g., number of times a particular stored content was used on the device), and/or may also be based on use count information received from other devices.

Once the least popular content data record stored on the listening device has been identified, a determination is made 550 whether the identified record is less popular than the selected non-resident record, e.g., by determining whether the popularity metric of the least popular public content data record is less than or exceeds the popularity metric of the non-stored content data record being tracked. If the least popular stored content is less popular than the non-resident content data record in question, the current least popular resident content data record is replaced with the non-resident content data records that was being tracked, e.g., by deleting 560 the current least popular resident content data record, and downloading 570 from a selected sending device the new content data record. If the least popular content record is more popular than the non-resident content data record being tracked, the non-resident content data record will generally not be downloaded (unless the operator of the device overrides the decision/determination not to download, and specifically authorizes downloading of the non-resident content), and non-resident content continues to be identified and/or tracked at 510 of the procedure 500. In some embodiments, the operations 550 may be skipped if the procedure 500 is to be implemented so that new non-resident content selected for possible downloading always has to be downloaded, whether or not it is more popular than the record it is to replace.

In some implementations, metadata of content data records that have been removed from storage (e.g., because they were replaced by newer, more popular content) may be placed in a storage space (such as a scratch pad) where the metadata associated with non-resident content data records is stored to enable identification and tracking of content available on the P2P system. Thus, in such embodiments, removed content may subsequently be downloaded again for storage in the device from which it was removed if it becomes sufficiently popular again. However, to avoid frequent removal and re-downloading of a particular content data record, a certain pre-determined time period (e.g., 1 day, 1 week, etc.) may need to elapse before that removed content is eligible to be downloaded again.

In some embodiments, some advertised content may be downloaded automatically by a listening device without regard to the content's popularity metric. For example, a listening device may be configured to automatically download content advertised by devices and/or operators that have been previously identified as friends or otherwise have been flagged as devices/operators whose advertised content is always to be downloaded.

In some implementations, a temporality element may be introduced in computation of popularity metrics for content data records. For example, a device may be configured to adjust self-use (e.g., self-view) counts associated with content data record stored on that device such that use/view counts may decay with time if content is old and not being viewed (which in turn results in a decrease in the computed popularity metric of the content data records on that device and/or on devices that receive messages advertising the content data records on that device). Such a temporal-based adjustment of use counts causes popularity metrics of older content data records to be decreased, which in turn favors discoverability of newer content by devices in the P2P system, and also makes it more likely that older content data records stored on the devices will be replaced by newer content data records.

Thus, in some embodiments, devices may be configured to adjust their use/view counts to reflect use of the content, as well as to reflect non-use of the content. For example, in response to a determination that a particular content data record stored on a device was used (e.g., at least 50% of the particular data content record was presented on an output user interface on the device, the particular data content record was presented on the output user interface of the device for a period of time exceeding a pre-determined period such as 10 second, etc.), the use count for that data record is increased (e.g., by a value of 1). Conversely, in response to a determination that that particular content data record was not used (e.g., not viewed) for some pre-determined period of time (e.g., 1 day, 1 week, etc.), the associated use count for that data record is adjusted to reduce it (e.g., by a value of 1). The adjustment of the use count associated with that particular record will thus impact the popularity metrics computed on listening devices receiving advertisements messages sent by the device corresponding to the particular record, and will also impact popularity metric computation performed locally on the device where the particular content data record is stored to enable, for example, management of the content data records stored on the device (e.g., to determine the least popular resident content data record in order to replace it with a more popular non-resident content data record from a remote device). It is to be noted that, in some embodiments, when a sending device transmits content data record to another device, both source and destination devices (i.e., the sending and listening devices) may exchange the local view count data for the content being transmitted/downloaded in order to update their use statistics and/or popularity metrics with respect to the particular content data record transmitted/downloaded.

Performing the various operations described herein may be facilitated by a processor-based computing system. Particularly, each of the various systems/devices described herein may be implemented, at least in part, using one or more processing-based devices (which may form part of devices described herein, including any of the devices 110a-k of FIG. 1). Thus, with reference to FIG. 6, a schematic diagram of a generic computing system 600 is shown. The computing system 600 includes a processor-based device 610 such as a personal computer, a specialized computing device, and so forth, that typically includes a central processor unit 612. In addition to the CPU 612, the system includes main memory, cache memory and bus interface circuits (not shown). The processor-based device 610 may include a mass storage element 614, such as a hard drive or flash drive associated with the computer system. The computing system 600 may further include a keyboard, or keypad, or some other user input interface 616, and a monitor 620, e.g., a CRT (cathode ray tube) or LCD (liquid crystal display) monitor, that may be placed where a user can access them.

Figure 6:
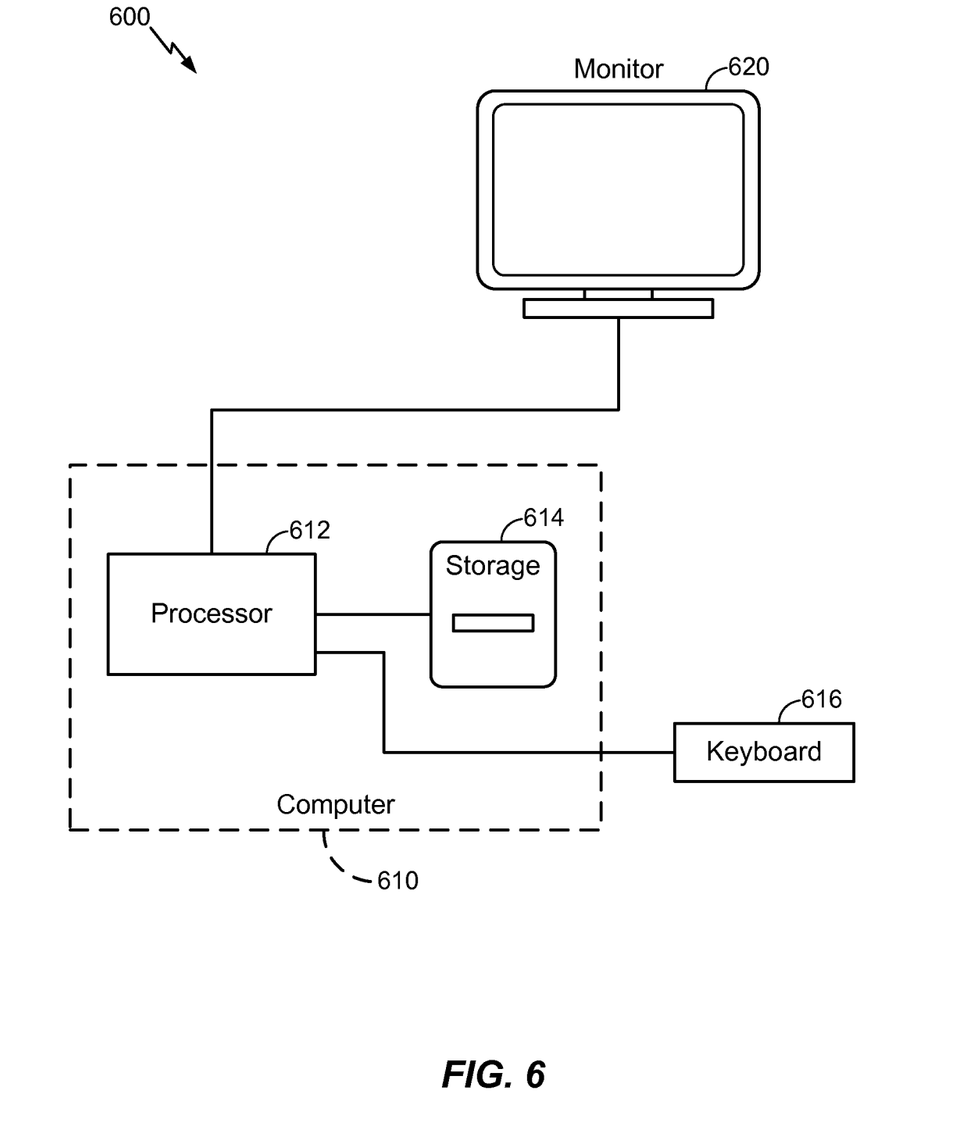
FIG. 6 is a schematic diagram of a generic computing system.

The processor-based device 610 is configured to facilitate, for example, the implementation of operations to monitor messages/communications advertising content stored on devices in a P2P system that are made available for distribution), to compute popularity metrics locally at listening devices based on use values associated with the content being advertised, etc. The storage device 614 may thus include a computer program product that when executed on the processor-based device 610 causes the processor-based device to perform operations to facilitate the implementation of the above-described procedures and operations. The processor-based device may further include peripheral devices to enable input/output functionality. Such peripheral devices may include, for example, a CD-ROM drive and/or flash drive (e.g., a removable flash drive), or a network connection (e.g., implemented using a USB port and/or a wireless transceiver), for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array), an ASIC (application-specific integrated circuit), a DSP processor, etc., may be used in the implementation of the system 600. Other modules that may be included with the processor-based device 610 are speakers, a sound card, a pointing device, e.g., a mouse or a trackball, by which the user can provide input to the computing system 600. The processor-based device 610 may include an operating system, e.g., Windows XP® Microsoft Corporation operating system, Android operating system, etc. Alternatively, other operating systems could be used.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. It is also to be understood that the order or hierarchy of operations in any procedure, process or method disclosed herein is an illustration of an example procedure, process, or method, and the specific order or hierarchy of operations may be rearranged. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method comprising:
    monitoring a plurality of messages from a plurality of mobile devices, each of at least some of the plurality of messages including at least one identifier of at least one content data record, from a plurality of content data records, stored at least on a sending device sending the respective message, and data representative of number of times the at least one content data record was used on the respective sending device;
    determining popularity metrics for one or more content data records from the plurality of content data records based on the data included in each of the at least some of the plurality of messages representative of the number of times the respective at least one content data record was used on the respective sending device; and
    adjusting at each sending device the number of times each of the data content records stored on the respective each sending device was used, the adjusting comprising:
        incrementing the number of times a particular data content record, stored on a particular sending device, was used when at least 50% of the particular data content record was presented on the particular sending device.

2. The method of claim 1, wherein the at least one identifier included in the each of the at least some of the plurality of messages comprises data identifying the originator of the associated at least one content data record.

3. The method of claim 1, wherein determining the popularity metrics for the one or more content data records from the plurality of content data records comprises:
    determining the sum of the times each of the one or more content data records was used on each sending device on which the respective each of the one or more content data records is stored; and
    determining a ratio of the sum of the times the each of the one or more of content data records was used on the each sending device on which the respective each of the one or more content data records is stored, and number of sending devices on which the respective each of the one or more content data records is stored.

4. The method of claim 1, further comprising:
    downloading one of the plurality of content data records associated with a popularity metric exceeding a pre-determined popularity threshold.

5. The method of claim 4, wherein downloading the one of the plurality of content data records comprises:
    in response to a determination that number of locally stored content data records exceeds a pre-determined capacity threshold:
        identifying a locally stored content data record associated with a corresponding popularity metric representative of the identified locally stored content data record being the least popular from the locally stored content data records; and
        replacing the identified locally stored content data with the one of the plurality of the content data records when the identified locally stored content data record is determined to be less popular than the one of the plurality of content data records.

6. The method of claim 1, wherein the adjusting at the each sending device the number of times the each of the data content records stored on the respective each sending device was used comprises:
    reducing the number of times a particular data content record stored on a particular sending device was used when the particular data content record was last presented on the particular device more than a pre-determined period.

7. The method of claim 1, wherein each of the at least some of the plurality of messages further includes at least one flag associated with the respective at least one content data record to indicate at least one attribute associated with the respective at least one content data.

8. The method of claim 7, wherein the at least one flag to indicate the at least one attribute associated with the respective at least one content data comprises:
    information to indicate of whether a user operating the respective sending device liked the respective at least one content data record.

9. A wireless communication device comprising:
    one or more processors;
    a transceiver to receive wireless messages; and
    storage media comprising computer instructions that, when executed on the one or more processors, cause operations comprising:
    monitoring a plurality of messages from a plurality of mobile devices, each of at least some of the plurality of messages including at least one identifier of at least one content data record, from a plurality of content data records, stored at least on a sending device sending the respective message, and data representative of number of times the at least one content data record was used on the respective sending device;
    determining popularity metrics for one or more content data records from the plurality of content data records based on the data included in each of the at least some of the plurality of messages representative of the number of times the respective at least one content data record was used on the respective sending device; and
    adjusting at each sending device the number of times each of the data content records stored on the respective each sending device was used, wherein the adjusting comprises:
        incrementing the number of times a particular data content record, stored on a particular sending device, was used when at least 50% of the particular data content record was presented on the particular sending device.

10. The device of claim 9, wherein the at least one identifier included in the each of the at least some of the plurality of messages comprises data identifying the originator of the associated at least one content data record.

11. The device of claim 9, wherein determining the popularity metrics for the one or more content data records from the plurality of content data records comprises:
   determining the sum of the times each of the one or more content data records was used on each sending device on which the respective each of the one or more content data records is stored; and
   determining a ratio of the sum of the times the each of the one or more of content data records was used on the each sending device on which the respective each of the one or more content data records is stored, and number of sending devices on which the respective each of the one or more content data records is stored.

12. The device of claim 9, wherein the instructions cause further operations comprising:
   downloading one of the plurality of content data records associated with a popularity metric exceeding a pre-determined popularity threshold.

13. The device of claim 12, wherein downloading the one of the plurality of content data records comprises:
   in response to a determination that number of locally stored content data records exceeds a pre-determined capacity threshold:
      identifying a locally stored content data record associated with a corresponding popularity metric representative of the identified locally stored content data record being the least popular from the locally stored content data records; and
      replacing the identified locally stored content data with the one of the plurality of the content data records when the identified locally stored content data record is determined to be less popular than the one of the plurality of content data records.

14. The device of claim 9, wherein the adjusting at the each sending device the number of times the each of the data content records stored on the respective each sending device was used further comprises:
   reducing the number of times a particular data content record stored on a particular sending device was used when the particular data content record was last presented on the particular device more than a pre-determined period.

15. The device of claim 9, wherein each of the at least some of the plurality of messages further includes at least one flag associated with the respective at least one content data record to indicate at least one attribute associated with the respective at least one content data.

16. The device of claim 15, wherein the at least one flag to indicate the at least one attribute associated with the respective at least one content data comprises:
   information to indicate of whether a user operating the respective sending device liked the respective at least one content data record.

17. An apparatus comprising:
   means for monitoring a plurality of messages from a plurality of mobile devices, each of at least some of the plurality of messages including at least one identifier of at least one content data record, from a plurality of content data records, stored at least on a sending device sending the respective message, and data representative of number of times the at least one content data record was used on the respective sending device;
   means for determining popularity metrics for one or more content data records from the plurality of content data records based on the data included in each of the at least some of the plurality of messages representative of the number of times the respective at least one content data record was used on the respective sending device; and
   means for adjusting at each sending device the number of times each of the data content records stored on the respective each sending device was used, wherein the means for adjusting comprises:
      means for incrementing the number of times a particular data content record, stored on a particular sending device, was used when at least 50% of the particular data content record was presented on the particular sending device.

18. The apparatus of claim 17, wherein the at least one identifier included in the each of the at least some of the plurality of messages comprises data identifying the originator of the associated at least one content data record.

19. The apparatus of claim 17, wherein the means for determining the popularity metrics for the one or more content data records from the plurality of content data records comprise:
   means for determining the sum of the times each of the one or more content data records was used on each sending device on which the respective each of the one or more content data records is stored; and
   means for determining a ratio of the sum of the times the each of the one or more of content data records was used on the each sending device on which the respective each of the one or more content data records is stored, and number of sending devices on which the respective each of the one or more content data records is stored.

20. The apparatus of claim 17, further comprising:
   means for downloading one of the plurality of content data records associated with a popularity metric exceeding a pre-determined popularity threshold.

21. The apparatus of claim 20, wherein the means for downloading the one of the plurality of content data records comprise:
   means for performing operations, in response to a determination that number of locally stored content data records exceeds a pre-determined capacity threshold, comprising:
      identifying a locally stored content data record associated with a corresponding popularity metric representative of the identified locally stored content data record being the least popular from the locally stored content data records; and
      replacing the identified locally stored content data with the one of the plurality of the content data records when the identified locally stored content data record is determined to be less popular than the one of the plurality of content data records.

22. The apparatus of claim 17, wherein the means for adjusting at the each sending device the number of times the each of the data content records stored on the respective each sending device was used further comprises:
   means for reducing the number of times a particular data content record stored on a particular sending device was used when the particular data content record was last presented on the particular device more than a pre-determined period.

23. The apparatus of claim 17, wherein each of the at least some of the plurality of messages further includes at least one flag associated with the respective at least one content data record to indicate at least one attribute associated with the respective at least one content data.

24. The apparatus of claim 23, wherein the at least one flag to indicate the at least one attribute associated with the respective at least one content data comprises:
information to indicate of whether a user operating the respective sending device liked the respective at least one content data record.

25. A non-transitory processor readable media programmed with a set of instructions executable on a processor that, when executed, cause operations comprising:
monitoring a plurality of messages from a plurality of mobile devices, each of at least some of the plurality of messages including at least one identifier of at least one content data record, from a plurality of content data records, stored at least on a sending device sending the respective message, and data representative of number of times the at least one content data record was used on the respective sending device;
determining popularity metrics for one or more content data records from the plurality of content data records based on the data included in each of the at least some of the plurality of messages representative of the number of times the respective at least one content data record was used on the respective sending device; and
adjusting at each sending device the number of times each of the data content records stored on the respective each sending device was used, wherein the adjusting comprises:
incrementing the number of times a particular data content record, stored on a particular sending device, was used when at least 50% of the particular data content record was presented on the particular sending device.

26. The processor readable media of claim 25, wherein the at least one identifier included in the each of the at least some of the plurality of messages comprises data identifying the originator of the associated at least one content data record.

27. The processor readable media of claim 25, wherein determining the popularity metrics for the one or more content data records from the plurality of content data records comprises:
determining the sum of the times each of the one or more content data records was used on each sending device on which the respective each of the one or more content data records is stored; and
determining a ratio of the sum of the times the each of the one or more of content data records was used on the each sending device on which the respective each of the one or more content data records is stored, and number of sending devices on which the respective each of the one or more content data records is stored.

28. The processor readable media of claim 25, wherein the instructions cause further operations comprising:
downloading one of the plurality of content data records associated with a popularity metric exceeding a pre-determined popularity threshold.

29. The processor readable media of claim 28, wherein downloading the one of the plurality of content data records comprises:
in response to a determination that number of locally stored content data records exceeds a pre-determined capacity threshold:
identifying a locally stored content data record associated with a corresponding popularity metric representative of the identified locally stored content data record being the least popular from the locally stored content data records; and
replacing the identified locally stored content data with the one of the plurality of the content data records when the identified locally stored content data record is determined to be less popular than the one of the plurality of content data records.

30. The processor readable media of claim 25, wherein the adjusting at the each sending device the number of times the each of the data content records stored on the respective each sending device was used further comprises:
reducing the number of times a particular data content record stored on a particular sending device was used when the particular data content record was last presented on the particular device more than a pre-determined period.

31. The processor readable media of claim 25, wherein each of the at least some of the plurality of messages further includes at least one flag associated with the respective at least one content data record to indicate at least one attribute associated with the respective at least one content data.

32. The processor readable media of claim 31, wherein the at least one flag to indicate the at least one attribute associated with the respective at least one content data comprises:
information to indicate of whether a user operating the respective sending device liked the respective at least one content data record.

* * * * *